May 7, 1963 R. B. HENNIS ETAL 3,089,123

CHARACTER RECOGNITION QUANTIZING APPARATUS

Filed Nov. 12, 1959 6 Sheets-Sheet 1

INVENTORS
ROBERT B. HENNIS
RUSSELL H. LARSON
BY [signature]
ATTORNEY

CHARACTER RECOGNITION QUANTIZING APPARATUS

Filed Nov. 12, 1959 6 Sheets-Sheet 2

May 7, 1963 R. B. HENNIS ET AL 3,089,123

CHARACTER RECOGNITION QUANTIZING APPARATUS

Filed Nov. 12, 1959 6 Sheets-Sheet 3

CHARACTER RECOGNITION QUANTIZING APPARATUS

Filed Nov. 12, 1959 6 Sheets-Sheet 4

United States Patent Office 3,089,123
Patented May 7, 1963

3,089,123
CHARACTER RECOGNITION QUANTIZING APPARATUS

Robert B. Hennis, Poughkeepsie, and Russell H. Larson, Wappingers Falls, N.Y., assignors to International Business Machines Corporation, New York, N.Y., a corporation of New York Filed Nov. 12, 1959, Ser. No. 852,326
4 Claims. (Cl. 340—146.3)

This invention relates to character recognition and more specifically to quantizing apparatus for determining whether successive increments of a signal produced upon the scanning of an energized character bearing surface are indicative of character forming surface areas.

Numerous types of character recognition systems have been disclosed including both single channel and multi-channel systems, and digital and analog type systems. The present invention is particularly adaptable to the type of system employing, in a plurality of channels, means for linearly scanning a character to be recognized and setting up in a storage matrix, by means of the multi-channel signals, a representation of a character scanned by the multi-channel scanning means, and employing means for recognizing the character representation set up in the storage matrix. Apparatus of this type is disclosed in the patent application of Eckelman, Hennis and Larson, Serial No. 804,996, filed April 8, 1959.

The present invention represents an improvement over the invention disclosed in the above mentioned patent application and relates to the portion of the system disclosed therein by which signals in each channel of the multi-channel system are analyzed to determine whether or not successive incremental portions thereof are representative of character forming areas, i.e., whether or not they are representative of "black" or "white" areas on the character bearing surface being scanned.

In the system of the above noted application and in many other types of character recognition systems, the circuitry for recognizing a character in the matrix requires the complete fulfillment of an absolute condition, thus, once the recognition statement for a character is established and logical circuitry is provided embodying that statement, only matrix conditions fulfilling that statement will be recognized as a character and upon the absence of even one of the matrix conditions required by that statement, non-recognition will occur. It will be evident that even though this non-recognition is distinguished from an error the occurrence of the non-recognition is undesirable.

When characters to be read are printed in magnetic ink, there are inevitably involved certain printing tolerances which must be granted to printers for the production of printed documents at reasonable costs. These tolerances, as will be further described, give rise to signal variations, unwanted signals, and voids in trains of desired signals, as well as to deviations in apparent locations of character edges. These conditions, resulting from normal printing tolerances, can affect character recognition quantizing apparatus to produce undesirable variations in the matrix patterns produced thereby adversely effecting the operation of the recognition statement logic networks by which the character representations in the matrix are recognized as the character scanned. Characters otherwise presented, such as, for example, for optical scanning, may present similar nonuniformities to the scanning means.

It is the principal object of this invention to provide a quantizing means which will minimize the adverse effects of required printing tolerances.

A further object of the invention is to provide quantizing means which will operate in response to the signals produced by scanning means scanning characters energized with a relatively low frequency alternating energization. By relatively low frequency is meant, for example, an alternating current magnetization of characters at a frequency at which, as the read head moves out of contact with the character printing, the signal level decreases at approximately the same rate of decrease as is experienced as the read head moves out of contact with D.C. energized magnetic characters.

More specifically, it is the primary object of the invention to provide quantizing means responsive to a signal produced by the scanning of an A.C. energized magnetic character for producing an output indicating the duration of character information bearing increments of said signal extending longer than a predetermined minimum time duration and having interruptions therein not exceeding a predetermined maximum time duration.

The foregoing and other objects, features and advantages of the invention will be apparent from the following more particular description of preferred embodiments of the invention as illustrated in the accompanying drawings.

By way of example, the invention disclosed herein will be disclosed in conjunction with the common machine language for mechanized check handling recommended by the Technical Committee on Mechanization of Check Handling of the Bank Management Commission of the American Bankers' Association. The character shape of this common language is referred to as E–13B and is set forth in the Bank Management Publication No. 147, dated April 1959, published by the Bank Management Commission of the American Bankers' Association.

Figure 7:
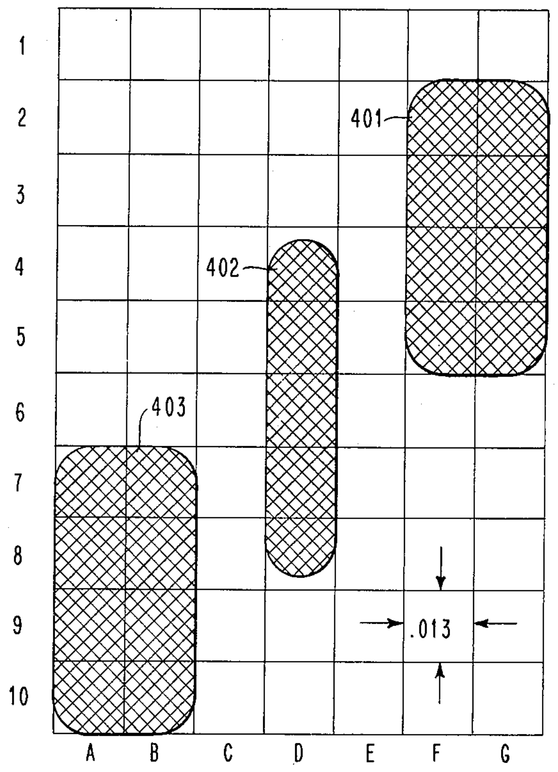
FIGURE 7 is an enlarged showing of a character to be recognized by the apparatus and drawn on a two-dimensional grid having the same number of grid defined areas as there are registers in the register matrix shown in FIGURE 1.

The characters of this common language include the ten arabic numerals 0–9 in somewhat stylized form and four special symbols. Each of these fourteen characters is drawn on a .013 inch grid. In FIGURE 7, there is shown the "amount symbol" drawn to an enlarged scale on a 13 mil grid. The symbol is formed by three vertically extending bars 401, 402, 403, having a minimum horizontal dimension of 13 mils and having a space between adjacent bars of 13 mils. It will be evident that a character such as this printed in magnetic ink and energized with an A.C. signal requires, to be recognized, apparatus which can recognize a 13 mil gap between magnetic printings, and can recognize a printed line 13 mils wide.

Figure 8:
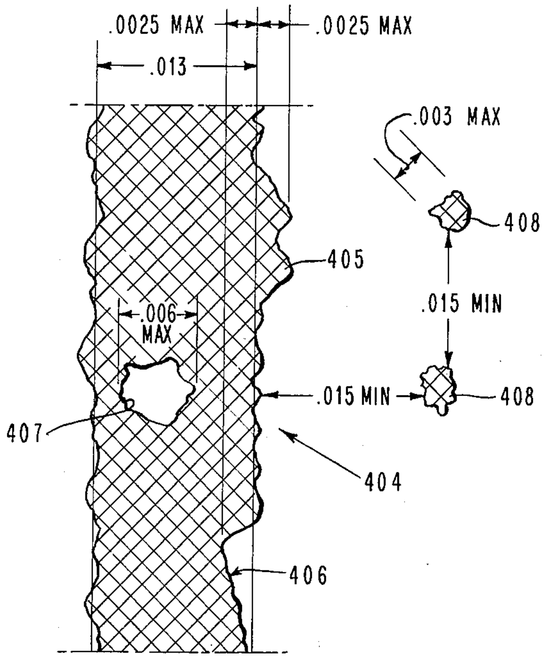
FIGURE 8 is a showing in greatly enlarged scale of a fragmentary portion of a line of a printed character.

In FIGURE 8, there is indicated at 404, in greatly enlarged scale, a fragmentary 13 mil wide line of a printed character. FIGURE 8 shows some of the various undesirable conditions which can occur in printing and indicates a reasonable tolerance of each of these conditions.

A first type of condition which exists is referred to as peaks and valleys. Peaks, as indicated at 405 and valleys, as indicated at 406, form irregularities in printed edges and should not exceed approximately .0025 inch above or below the normal character edge.

Voids, as indicated at 407, occur in the body of a printed character and are desirably restricted to a maximum dimension of approximately .006 inch in any one direction.

Spatter indicated generally at 408, is frequently of random occurrence and is preferably limited to ink spatters not exceeding approximately .003 inch in any one direction and occurring with a spacing of not less than approximately .015 inch between individual spatters or the nearest line edge.

As will hereinafter become evident, in connection with the description of the present invention, quantizing means employed in character recognition apparatus must be capable of recognizing characters in response to signals produced upon the scanning of the characters and must function in such a manner as not to be adversely influenced by peaks and valleys, voids and spatter and other printing tolerances occurring to a reasonable degree, to the extent that erroneous quantizing and thus misrecognition or nonrecognition of the character scanned will result.

It is again noted that the type font and the dimensions referred to above in connection therewith are set forth only for purposes of example and to provide a meaningful background upon which the invention can be disclosed. The invention is not limited to this particular type font or to the particular type font dimensions described herein. The invention has a broad application and should be broadly construed as recited in the accompanying claims.

Figure 1:
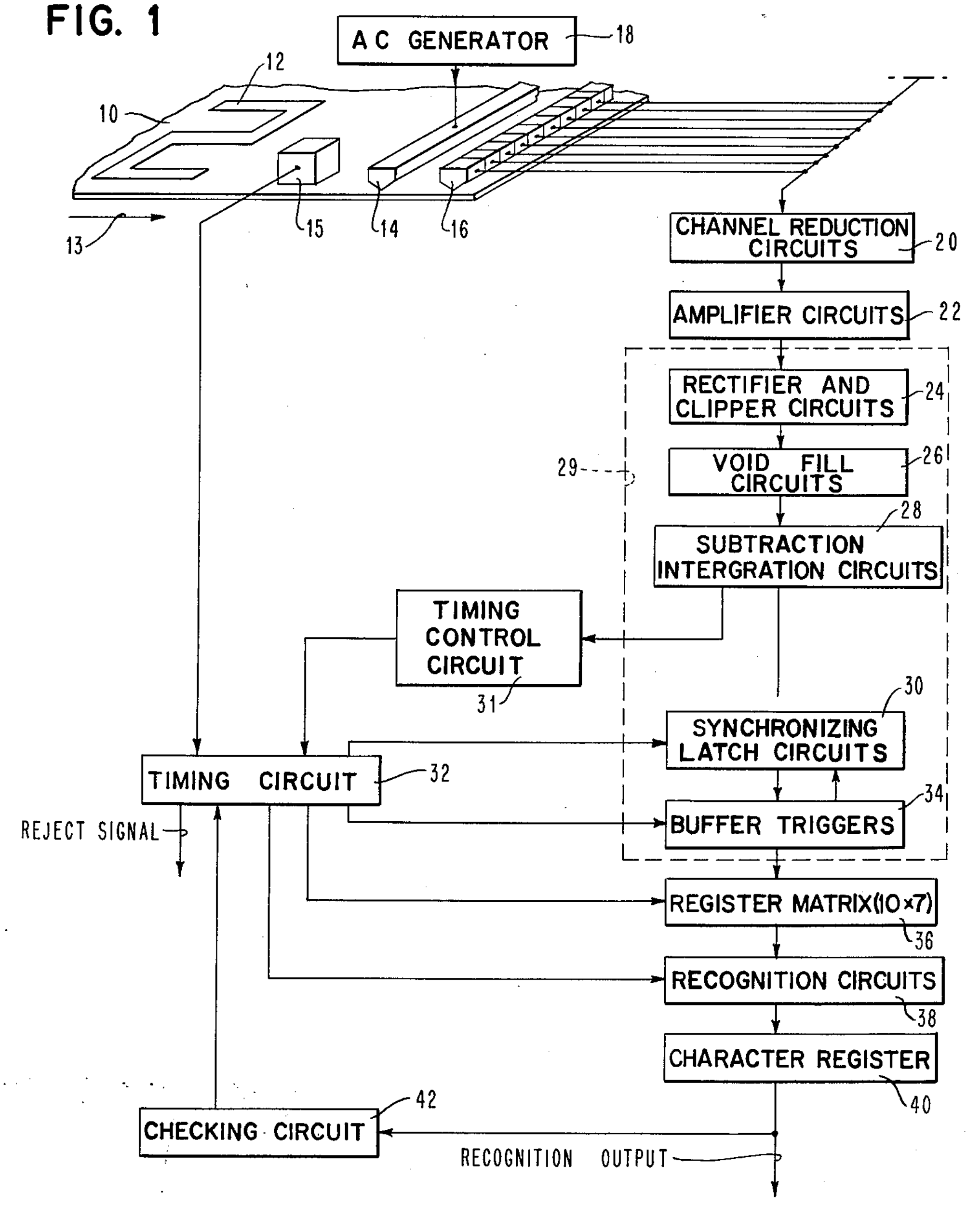
FIGURE 1 is a block diagram showing the various component parts of the embodiment of the invention disclosed herein.

In FIGURE 1, there is shown at 10, a fragmentary portion of a document or other surface forming means carrying indicia 12. The indicia shown is in the form of the numeric character "2." The character is printed by means of magnetic ink and is adapted to be sensed by magnetic scanning means.

The document 10 is advanced in the direction of the arrow 13 by any conventional means and the character 12 is carried past magnetic write and read heads 14 and 16, respectively, positioned to scan the character as it passes thereby.

The write head 14 is powered from an A.C. source 18 which may conveniently be, for example, a 15 kc. generator for reasons which will be hereinafter described.

The read head 16 is actually a plurality of read heads positioned adjacent to one another to provide multi-channel scanning of characters passing thereunder. It is desirable to provide write and read heads of sufficient length with respect to the vertical height of the character to be read to insure scanning of the entire height of each character even though successive groups of characters may be displaced vertically with respect to each other or printed on various horizontal lines. Accordingly, a single extended write head is used and, in conjunction therewith, a read head is employed having in the arrangement described a number of heads which is an even multiple of the minimum number of heads desirably employed to fully scan a single character. Outputs from the multi-channel read head 16 are delivered to channel reduction circuits 20.

In the embodiment of the invention described herein, the channel reduction circuits receive outputs from twenty magnetic heads in the read head 16 and reduce these to ten channels for subsequent manipulation. The ten channels represent a sufficient length of the read head 16 to insure the multi-channel scanning of the entire height of a character 12.

While various types of character printing, character energizing and character scanning means may be employed, for certain purposes magnetic printing, magnetic energizing and magnetic scanning are preferred. Regardless, however, of the particular arrangement employed, the essential objective is the production of signals on each of the ten channels representing horizontal scanning through a character to be recognized. It will also be evident that the selection of ten channels is arbitrary depending upon the configuration of the characters to be identified as well as the total number of characters to be recognized.

As shown in FIGURE 1, each of the ten channels forming the output from the channel reduction circuits 20, is delivered to an amplifier circuit 22, serving to amplify the signal received. The amplified signals of each channel are delivered to rectifier and clipper circuits 24.

Figure 2:
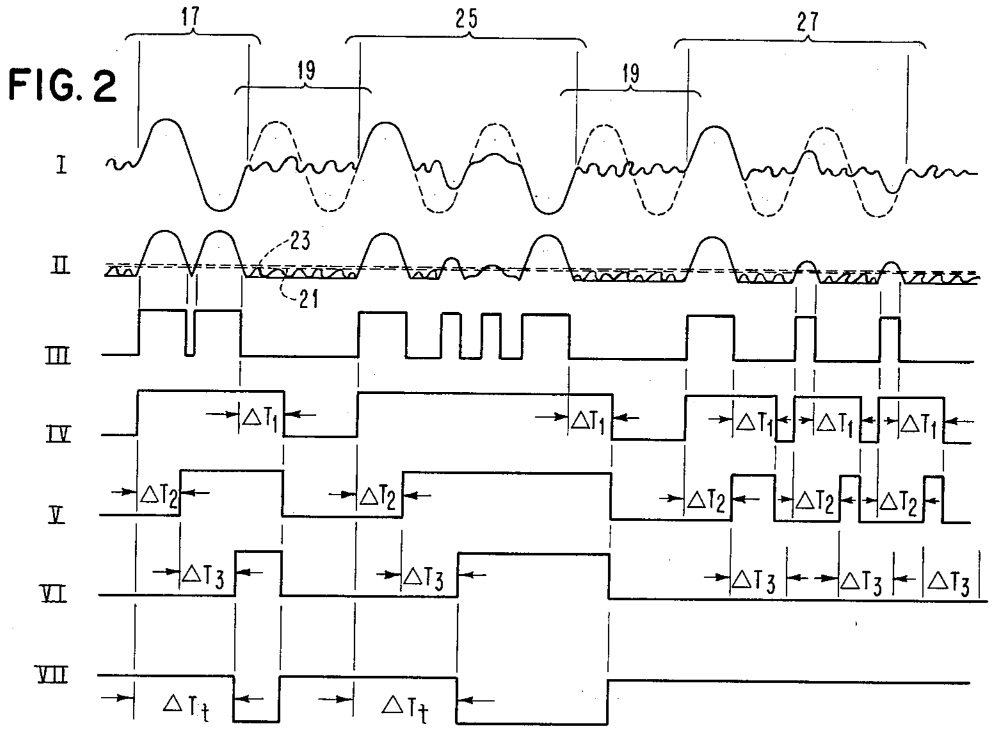
FIGURE 2 is a timing diagram showing wave forms appearing at various locations in the apparatus during reading of a character.

In FIGURE 2, there is shown on line I, a hypothetical example of a portion of a signal carried in one of the ten channels. Numeric or other characters to be recognized may be variously formed or stylized and, for any given width of vertical line employed in printing a character, the rate of travel of the document bearing the character and the frequency of A.C. source powering the write head are desirably selected to provide, when the read head 16 of a given channel crosses the minimum width character line, an A.C. wave of approximately 1 cycle duration as that indicated under the bracket 17 in line I rising out of the background noise indicated under the brackets 19.

For example, stylized characters may be employed having line widths formed of one or more increments of .013 inch in width and the character may be advanced past the read head at such a rate that the line increments of .013 inch pass the read head within 65 microsecond intervals. Under these conditions, if a 15 kc. energizing signal is employed, there will occur one cycle of the 15 kc. signal during passage of each line increment width. Thus in FIGURE 2, the portion of the signal on line I covered by bracket 17, represents a black area width of one character line increment. Similarly, a two cycle signal indicated under the bracket 25 represents a black area width of two character line increments.

In the rectifier circuits indicated at 24, in FIGURE 1, a full wave rectification is performed, and in the clipper circuits, also indicated at 24, the rectified wave is further amplified and clipped between upper and lower levels. There is passed only the portion of the rectified wave shown between the threshold line 21 and the peak line 23 shown in line II of FIGURE 2. The threshold line 21 is sufficiently high to cut out substantially all of the background noise contained in the signal. The peak line 23 is sufficiently low to provide a uniform amplitude level for the information carrying portion of the signal and to produce a resulting substantially square wave signal. This clipping is also employed for the reason that various printings, which may be printed from various inks and from inks of various thicknesses, and printing variations in individual characters or in successive characters, will give rise to wide variations in amplitude of the output signals from the read heads and, accordingly, wide variations in amplitude of the information bearing portions of the channel signal shown in line I of FIGURE 2. Furthermore, the wave is sufficiently amplified that the clipped wave is substantially a square wave. This clipped and shaped wave, which is a fine line sample of the wave on line II, is shown on line III of FIGURE 2.

The clipped and shaped wave is delivered to a void fill circuit 26 in FIGURE 1. This circuit responds immediately to any rise at its input with a rise at its output but will not respond to a fall at its input until after a time period of $\Delta T_1$. In FIGURE 2, the output of this circuit is shown on line IV. As will become evident up viewing line IV of FIGURE 2, the $\Delta T_1$ void fill delay is sufficient to fill the voids occurring between half cycle pulses such as that occurring under the bracket 17 in FIGURE 2, and is also sufficient to fill voids which do not completely lose a half cycle pulse of line I such as those indicated under the bracket 25. However, voids of sufficient duration to cause the loss of a half cycle or more, such as those shown under the bracket 27 are not filled by the $\Delta T_1$ void fill. It will be noted that this is consistent with the void tolerance discussed in connection with FIGURE 8.

The output from the void fill circuit 26 is delivered to a subtraction-integration circuit 28. This circuit provides two time delays one indicated on line V of FIGURE 2, as $\Delta T_2$ and the other indicated on line VI of FIGURE 2 as $\Delta T_3$.

The subtractor circuit responds to a rise on its input after a delay of $\Delta T_2$ and responds to a fall at its input immediately. The time $\Delta T_2$ is selected to be equal to the time $\Delta T_1$, thus, the time duration of the pulse appearing on line V resulting from the wave under bracket 17 of line I, is equal to the time duration of the rectified one cycle appearing above the threshold value 21 on line II. Accordingly, the $\Delta T_2$ time delay has corrected for the $\Delta T_1$ time delay previously described and the net result is a signal on line V with all voids of less than $\Delta T_1$ time filled. It will be noted from the portions of the various waves under bracket 27 that the signal appearing on line V is a series of separated pulses without void fill when the voids appearing on line III are in excess of $\Delta T_1$ time.

The integration portion of the subtraction-integration circuit operates in the same manner as the subtraction portion of the circuit to produce a delay in the rise of its output following a rise of its input without producing a delay in the fall of its output following the fall of its input. The purpose of this circuit is to determine that its input signal is of sufficient duration to be called a usable character line signal. The pulses appearing on line V under the brackets 17 and 25 are both of longer time duration than $\Delta T_3$ and accordingly a signal appears on line VI following $\Delta T_3$ time. However, under the bracket 27, the pulses appearing on line V are of shorter interval than time $\Delta T_3$ and thus no pulses appear on line V.

These three timing circuits function in such a way as to take advantage of the various characteristics of magnetic character printing and serve to overcome to a large degree the undesirable effects of voids in the ink printing of a character, variations in width of character lines and the effect of ink spatter. These considerations will be discussed hereinafter in greater detail.

Line VII in FIGURE 2 represents an inversion of the signal on line VI but is noted with a time delay which is equal to the sum of $\Delta T_2+\Delta T_3$. In the actual circuit provided, as will be described in connection with FIGURE 3, the time delays $\Delta T_2$ and $\Delta T_3$ are combined and provided simultaneously and the actual output signal as provided by that circuit is of the form shown on line VII.

Referring again to FIGURE 1, it will be recalled that the apparatus thus far described in connection with circuits 20—28 involve ten parallel identical channels. The output of these ten channels is delivered to a timing control circuit 31 and upon the simultaneous delivery of output signals on two of these channels to the timing control circuit 31, a signal produced by the timing control circuit 31 is delivered to the timing circuit 32.

The output of each of the ten subtraction-integration circuits 28 is also delivered to a respective synchronizing latch circuit 30. Each of the synchronizing latch circuits acts, upon operation of the timing control circuit 31 and under control of the timing circuit 32, to set itself if a character increment indicating pulse, as shown on line VII in FIGURE 2, is present in that channel. The timing circuit 32 functions to provide pulse counting signals commencing with the first occurrence of simultaneously existing outputs in at least two of the subtraction-integration circuits, as signalled by the timing control circuit 31, indicating the on set of a character to be recognized. The timing circuit 32 thus provides a means for dividing the character into time increments as the character is scanned by the multi-channel head 16.

During each of these time increments, the buffer triggers 34 are successively set and sampled and their condition transferred to a column of triggers in a register matrix 36. In the embodiment of the invention disclosed, the register matrix consists of ten rows of triggers one row being provided to receive signals from each of the ten channels passing through the digitalizing circuitry previously described.

It will be observed that the character shown in FIGURE 7 is superimposed upon a grid having ten horizontally extending channels indicated at 1–10 and seven vertically extending channels indicated at A–G. This provides a representation of the register matrix 36 which is a 7 x 10 matrix of binary storage elements.

The timing circuit 32 serves to divide the character scanning interval into seven character increments and, under control of the timing circuit 32, the buffer triggers in each of the ten channels are sampled after the end of each of the seven character increments and thereafter the trigger conditions are transferred to corresponding triggers in the matrix register. Accordingly, at the end of the seven time increments A–G, there will appear in the register matrix a representation of the character scanned.

At the completion of the character time, the triggers of the matrix register 36 are interrogated by recognition circuits indicated at 38 in FIGURE 1, and the outputs of the recognition circuits 38 are delivered to a character register 40. The character register is conveniently in the form of triggers, one representing each of the characters possibly recognized by the recognition circuits.

The outputs of the character register triggers are delivered to any desired utilization apparatus and are also delivered to a checking circuit 42 which checks to confirm the recognition of one character and not more than one character from any one matrix pattern, and generates in conjunction with the timing circuit 32, a reject signal if less than one character or more than one character is recognized.

The apparatus shown in FIGURE 1, with the exception of that contained within the construction line outline 29, is completely disclosed in the above noted patent application. The elements contained within the construction line outline 29 represent improvements over the circuitry described in the above noted patent application and will be hereinafter described in greater detail.

The read heads 16, the channel reduction circuits 20, and the amplifier circuits 22, may be constructed from well known apparatus however preferred arrangements have been disclosed in the above noted patent application.

Similarly, the register matrix 36, recognition circuitry 38, character register 40, and checking circuits 42, may take various forms, however, highly satisfactory forms of these circuits are also shown in the above noted patent application.

The timing control circuit 31 provides, as previously noted, an output signal upon the reception of an input signal on more than one of its ten input lines. Circuitry of this type is known, however, a highly satisfactory circuit for accomplishing this is disclosed in the above noted patent application.

The timing circuit 32 shown in FIGURE 1 provides control for the transfer of information from the buffer triggers to the register matrix 36, controls the operation of the recognition circuits 38 and is responsive to an error signal from the checking circuit 42. The details of the timing circuit 32 do not form a part of the novel invention disclosed herein. This circuitry is fully described in the above noted patent application and this description need not be repeated herein.

Figure 4:
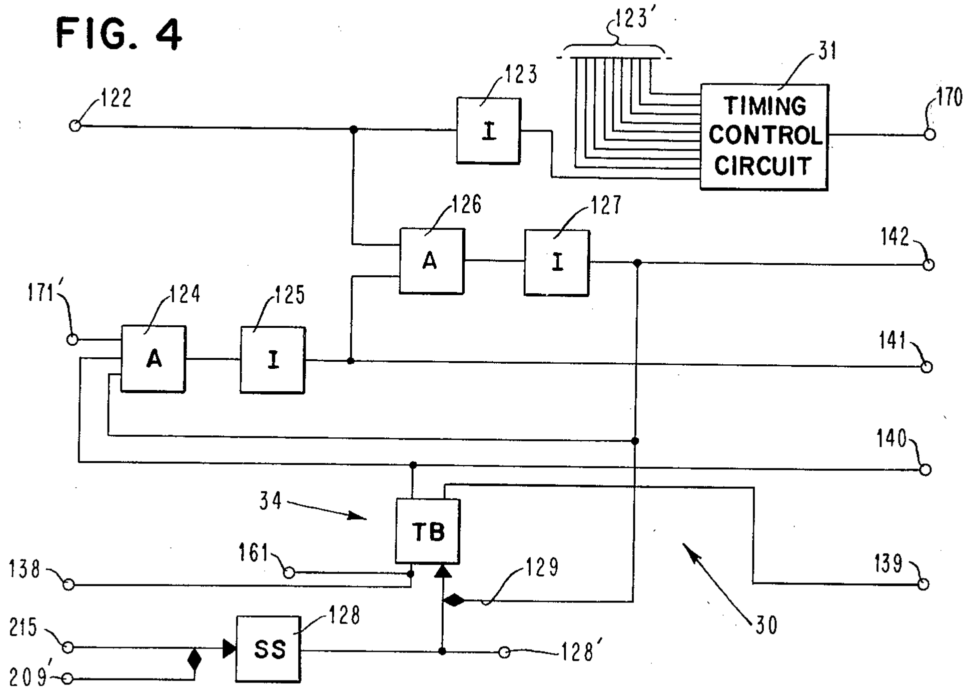
FIGURE 4 is a circuit diagram of the synchronizer latch circuit shown in FIGURE 1.
Figure 5:
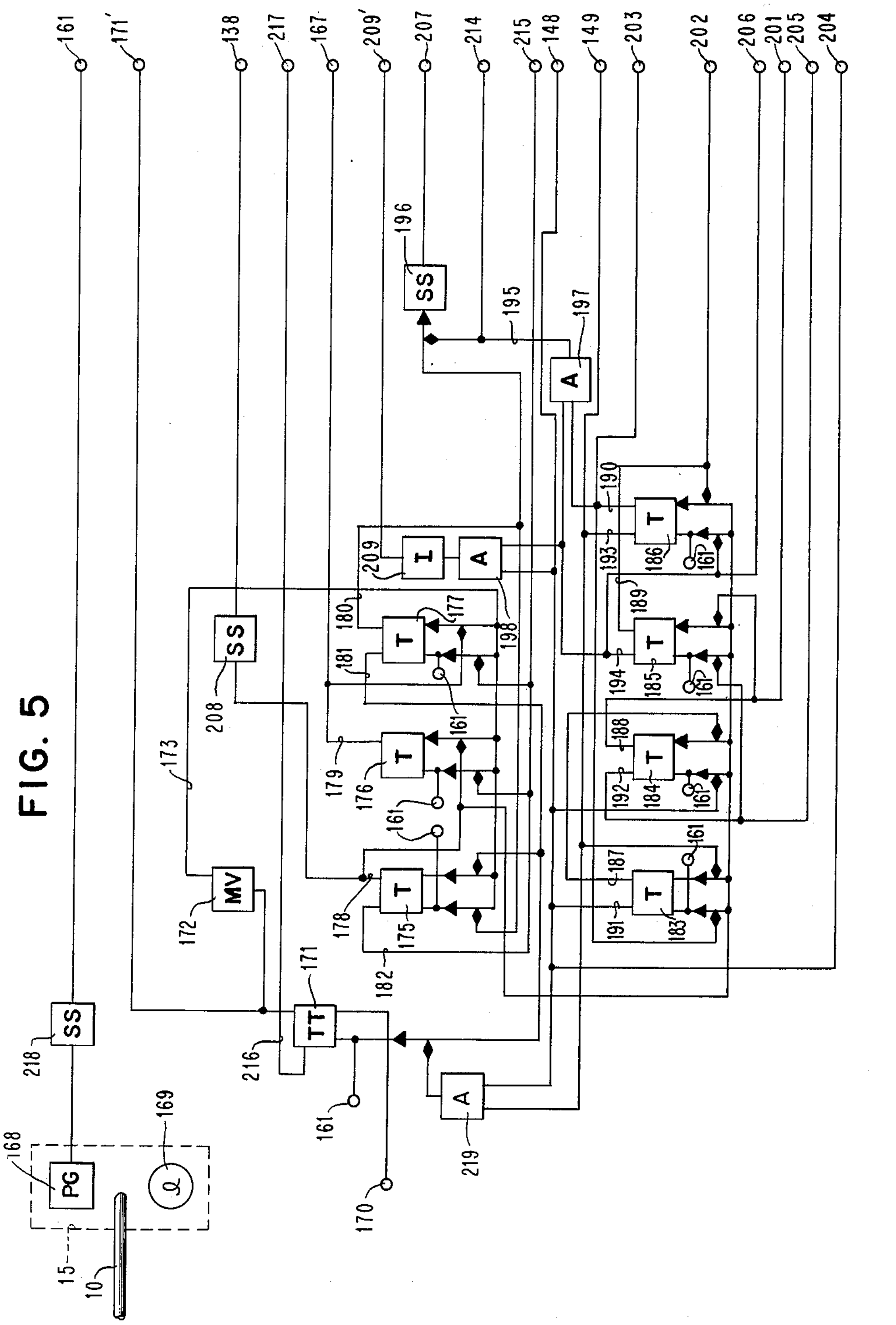
FIGURE 5 is a circuit diagram of a portion of the timing circuit 32 shown in FIGURE 1.

However, the synchronizing latch circuit 30 and the buffer triggers 34 are controlled by pulses provided by the timing circuit 32. Accordingly, those elements of the timing circuit 32 involved in the functioning of the apparatus shown within the construction line outline 29 of FIGURE 1 will be hereinafter described. The portion of the timing circuit 32 described herein in connection with FIGURE 5, is substantially identical with that described in the above noted patent application in connection with FIGURE 7 therein, except for the interconnections necessary for operation of the synchronizer circuit 30 which is shown in FIGURE 4. The output of the buffer triggers 34 described herein is identical to the output of the buffer triggers described in the above noted patent application, and the signals delivered thereby to the matrix register and the matrix register control by the timing circuit 32 are identical to those described in the above noted patent application.

In FIGURE 1, there is also provided, as indicated at 15, means for sensing the leading edge of a character bearing surface, such as a card, sheet or other document forming means. The document sensing means 15 serves to provide an output pulse in response to the leading edge of a document and this pulse is employed to insure proper setting of various components of the circuitry, which will be hereinafter described, prior to the commencement of a character reading cycle.

Figure 3:
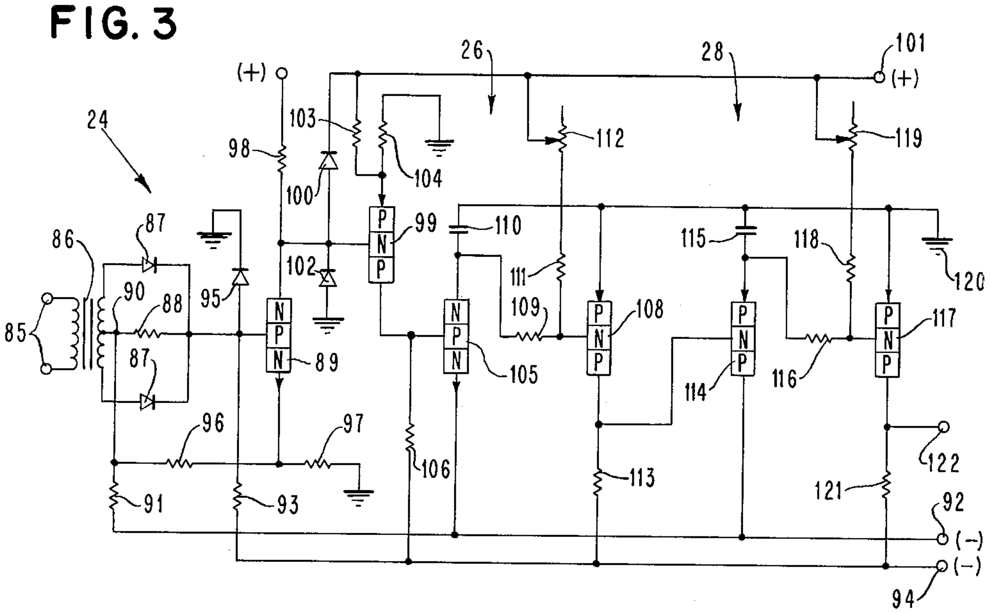
FIGURE 3 is a circuit diagram of the rectifier and clipper circuit, void fill circuit and subtraction-integration circuit shown in FIGURE 1.

Referring now to FIGURE 3, there is indicated generally at 24 the rectifier and clipper circuit. There is indicated generally at 26 the void fill circuit. There is indicated generally at 28, the subtraction-integration circuit. These three circuits are shown in FIGURE 3 for one channel and it will be evident that these circuits are identical for each of the ten channels receiving the outputs of the channel reduction circuits 20 through amplifier circuits 22.

In the following description of the circuits of FIGURE 3, reference will be made to specific voltage levels in order to clarify the description of the operation of the circuit. It will be evident, however, that these voltage values are cited merely by way of example and the invention is not limited by the operation at these levels.

Referring to FIGURE 3, the input terminals 85 of the transformer 86 receive the output of the amplifier circuit 22 of the corresponding channel. The end terminals of the output winding of transformer 86, are each connected to the anode of a diode 87. The cathodes of these diodes are connected to the base of an NPN transistor 89. The mid-point 90 of the transformer output winding is connected through a resistance 88 to the base of the transistor 89 and is also connected through a resistance 91 to a suitable source of negative potential at 92. The base of the transistor 89 is connected through a resistance 93 to a suitable source of negative potential 94. The emitter of the transistor 89 is connected through a resistance 97 to ground. The base of transistor 89 is also connected to the anode of a diode 95 the cathode of which is connected to ground.

The collector of transistor 89 is connected through a resistance 98 to a suitable source of positive potential. The collector is also connected to the base of PNP transistor 99. The base of transistor 99 is also connected to the cathode of a diode 102 the anode of which is connected to ground and to the anode of a diode 100 the cathode of which is connected to a suitable source of positive potential at 101. The emitter of transistor 99 is connected through a resistance 104 to ground and through a resistance 103 to the source of positive potential 101. The collector of transistor 99 is connected through a resistance 106 to the source of negative potential 94.

The input A.C. voltage signals presented at terminals 85 are fully rectified by the diodes 97 and resistance 88 and the rectified wave is presented to the base of transistor 89. This wave has the form of the wave shown on line II, FIGURE 2.

By way of example, it is noted that the negative potential source 92 may be −6 volts and the negative potential at source 94 may be −12 volts and by proper selection of resistance values, the emitter of transistor 89 may be provided with a −2 volt potential and the base of the transistor biased at −4 volts. Thus, it is necessary for the fully rectified signals to go more positive than −2 volts before transistor 89 conducts, and, the threshold value indicated at 21 in line II of FIGURE 2 is for example −2 volts and serves to cut out all undesirable background noise.

Once the input signal has gone more positive than −2 volts, transistor 89 will conduct, its collector voltage drops and is clamped at ground by diode 102. The signal on the base of transistor 89 may continue to rise with the emitter voltage following it until diode 95 clamps the base to ground. Diode 95 is necessary because at this time, transistor 89 is saturated and the collector voltage would go more positive if the base were not clamped at ground.

When transistor 89 is not conducting, its collector voltage rises towards the level of positive potential to which the resistor 98 is connected, which may be for example, 12 volts, and is clamped at the voltage level of the source 101, which may be for example, +6 volts. With its base at +6, transistor 99 is biased off by the resistor network at its emitter. The network biases the emitter more negative than the base by several tenths of a volt and, when transistor 99 goes off, its collector falls toward −12 volts through resistance 106. When transistor 89 is on, and diode 102 clamps the base of transistor 99 at ground, a fixed current, established through transistor 99 by the voltage on its base, appears at its emitter. This current is more than sufficient to make the collector voltage more positive than −6 volts. As a result, a transistor 105, having its base connected to the collector of transistor 99 as will be hereinafter described, is turned on and saturated by this current.

Thus, transistors 89 and 99 amplify the signal heavily and clip off the top of the signal so that the signal at the collector of transistor 99 is a fine line sample of the input to transistor 98. Such a signal is shown on line III of FIGURE 2.

The void fill circuit indicated at 26 includes the NPN transistor 105 and a PNP transistor 108. As previously noted, the collector of transistor 99 is connected to the base of transistor 105 and is also connected through a resistance 106 to the negative potential source 94. The emitter of transistor 105 is connected to the potential source 92 and the collector is connected through a capacitor 110 to ground at 120. The collector is also connected through a resistance 109 to the base of transistor 108. The base of transistor 108 is also connected through a resistance 111 and adjustable resistor 112 to the positive potential source 101. The emitter of transistor 108 is connected to ground at 120 and its collector is connected through resistance 113 to the potential source 94. The operation of this circuit will be described after the elements of the subtraction-integration circuit are described.

The subtraction-integration circuit indicated generally at 28 includes two PNP transistors, 114 and 117. The collector of transistor 108 is connected to the base of transistor 114. The collector of transistor 114 is connected to the source of negative potential 92 and its emitter is connected through a capacitor 115 to ground at 120. The emitter of transistor 114 is also connected through a resistance 116 to the base of the transistor 117.

The base of the transistor 117 is also connected through a resistance 118 and adjustable resistor 119 to the source of positive potential 101. The emitter of transistor 117 is connected to ground at 120 and the collector is connected through a resistance 121 to the source of positive potential 94. The subtraction-integration circuit output is taken from the collector of transistor 117 at 122.

Referring again to the void fill circuit 26, transistors 105 and 108 which make up the void fill timer are off in their normal state. Thus, the output at the collector of transistor 108 is clamped at the negative potential of source 92, i.e., —6 volts, by transistor 114. A signal appearing at the base of transistor 105 turns on the transistor immediately turning on transistor 108 causing the voltage at the collector of transistor 108 to rise to ground. When transistor 105 turns on, the capacitor 110 commences to charge and charges up to the level of negative potential at source 92, i.e., —6 volts.

When the input signal at the base of transistor 105 falls, it falls towards —12 volts and turns off transistor 105. Capacitance 110 then starts to discharge through resistance 109. At a time $\Delta T_1$, thereafter when the current through resistance 109 minus the current through resistance 111 and resistor 112 is less than that required to keep transistor 108 on, transistor 108 will turn off and its output will fall to —6 volts. If the input signal at the base of transistor 105 rises before the transistor 108 turns off, the capacitor 110 will be recharged and of course the transistor 108 will not turn off.

The adjustable resistor 112 is used as a fine adjustment on the timing of the circuit and is used to adjust out all initial circuit parameter deviations. The signal at the collector of transistor 108 is the same as that at the base of transistor 105 except that all signal voids less than $\Delta T_1$ are filled and the signal is $\Delta T_1$ longer in time. In FIGURE 2, the wave on line III represents inputs to the transistor 105 and the wave on line IV represents corresponding outputs from transistor 108 providing the $\Delta T_1$ void fill and time delay at the end of the signal.

As previously described, transistors 114 and 117 make up the subtraction-integration circuit. The normal state of this circuit is with the two transistors on. The base of transistor 114 is normally at —6 volts thus the transistor is on and capacitor 115 is charged. When a signal arrives at the base of transistor 114, the base potential rises to ground, the transistor 114 is cut off by the back bias on its emitter and capacitor 115 starts to discharge through resistance 116. At a time $\Delta T_t$ thereafter when the current through resistance 116 minus the current through resistance 118 and potentiometer 119 is less than that required to keep transistor 117 on, transistor 117 will turn off and its output taken at terminal 122 will fall to the level of the negative potential 94, i.e., —12 volts. It is necessary for a signal to remain on the base of transistor 114 for a period of time $\Delta T_t$ before the output at terminal 122 will fall and this output will remain down as long as the potential of the base of transistor 114 remains at ground. If the signal at the base of transistor 114 rises, even momentarily before the time $\Delta T_t$ has elapsed, the capacitor 115 will be recharged and a new time interval $\Delta T_t$ will be required after the next rise in the signal appearing at the base of transistor 114 before the transistor 117 will turn off.

The two time intervals indicated at $\Delta T_2$ and $\Delta T_3$, on lines V and VI of FIGURE 2, are both provided by the $\Delta T_t$ time delay provided by the subtraction-integration circuit of FIGURE 3 and, as shown on line VII of FIGURE 2, the output of transistor 117 is in the form of negative going pulses.

One of the ten synchronizing latch circuits indicated at 30 in FIGURE 1, is shown in FIGURE 4. The input signal is received at terminal 122 which is connected to the collector of the transistor 117 of the subtraction-integration circuit for that channel. This signal is passed through an inverter 123 and is delivered to the timing control circuit 31. Similarly, the outputs of the subtraction-integration circuits of the other ten channels as indicated at 123' are delivered to the timing control circuit 31 and upon the simultaneous occurrence of two signals in the outputs of the ten subtraction-integration circuits, the timing circuit produces an output at terminal 170. As previously noted, this circuit is identical with the timing control circuit described in the above mentioned patent application.

As will be hereinafter described, in FIGURE 5 there is shown a trigger 171. This trigger is turned on by a pulse produced by the timing control circuit on terminal 170. The on-side output of trigger 171 is taken on terminal 171' and is connected to one input of a three-way AND circuit 124 shown in FIGURE 4. The output of this three-way AND circuit 124 is connected through an inverter 125 to an output terminal 141 and to one input of a two-way AND circuit 126. The other input of the AND circuit 126 is connected to terminal 122. The output of AND circuit 126 is connected through inverter 127 to an output terminal 142. The output of inverter 127 is also connected to one input of the AND circuit 124.

Indicated at 34 and labeled TB is one of the ten buffer triggers indicated at 34 in FIGURE 1. The buffer triggers are turned off by pulses delivered to either of terminals 138 and 161 from the circuit of FIGURE 5 as will be hereinafter described. The buffer triggers are turned on by the output of a single shot 128 gated to the on-side input of each buffer trigger by the output of inverter 127 of its associated latch circuit appearing on line 129. Terminal 128' connects to the other buffer triggers. The single shot 128 is actuated by pulses appearing at terminal 215 gated into the single shot 128 by means of pulses appearing in 209'. The pulses at 215 and 209' are controlled by the timing circuit of FIGURE 5 while any suitable gating arrangement may be employed, the type represented by the convention shown in the drawing is fully described in the above noted patent application.

The off-side output of the buffer trigger provides the third input for the three-way AND circuit 124 and provides an output at terminal 140. The on-side output of the buffer trigger provides an output at terminal 139.

The operation of the synchronizing latch circuit is as follows; when characters are not passing under the read head and no signals are appearing at the outputs of any of the quantizer circuits, the potential at terminal 122 and at the output of the inverter 125 are both up, the AND circuit 126 is producing a signal which is inverted by inverter 127, thus, the output of terminal 142 is down and the output at terminal 141 is up.

Also at this time, the buffer trigger is in an off condition and thus the output at terminal 140 is up and the output at terminal 139 is down. At this time, the output of trigger 171 taken on terminal 171' is down and the output from the AND circuit 124 is down.

When any of the quantizer circuits has seen information bearing signals of sufficient time duration to respond, the signal at terminal 122 of that channel will fall causing the output of its AND circuit 126 to fall and the output at terminal 142 to rise. So long as only one quantizer circuit channel has responded, nothing further occurs and when the potential at terminal 122 rises, signifying a signal gap unfilled by the quantizer circuit, the synchronizing latch circuit will go back to its reset condition. Thus, isolated bits of noise are gated out of the recognition system.

If, however, two quantizing channels produce simultaneous output signals at their respective terminals 122, the timing control circuit 31 will operate producing a pulse at terminal 170 which will turn on the trigger 171 of FIGURE 5 and raise the signal at terminal 171' delivered to AND circuit 124. At this time, the output of inverter 127 is up and the off-side output of the buffer trigger is up, thus, the output of AND circuit 124 will rise, the output of inverter 125 will fall and this condition will remain until the buffer trigger is turned on by the next pulse produced by the single shot 128 which is gated to the buffer trigger by the signal on line 129.

When the buffer trigger comes on, the signal on line 140 falls and the signal on line 139 rises. The output of the AND circuit 124 falls and the output of inverter 125 rises. If there is no signal at terminal 122, the output of inverter 127 will be down. If, however, there is a signal at 122, the output of inverter 127 will be up and upon the occurrence of the next pulse at 138, resetting the buffer trigger to an off condition, the output of AND circuit 124 will again rise and the output from inverter 125 will go down, the output at 142 will be up, the output at terminal 140 will be up and the output at terminal 139 will be down.

As previously noted, and as will be hereinafter more fully described, the control pulses for the buffer trigger provided by the timing circuit 32 are so timed that the buffer trigger will be turned on after the end of the successive character increment intervals if there is a signal appearing at terminal 122 of its corresponding channel. The buffer trigger output signals at terminals 139 and 140 are delivered, under control of pulses from the timing circuit 32, to storage elements of the appropriate channel in columns G—B of the matrix trigger as indicated in FIGURE 7. The signals appearing at terminals 141 and 142 are delivered, under control of pulses from the timing circuit 32, to the appropriate channel in column A of the register matrix. The timing of these transfers will be hereinafter described in connection with the control circuitry shown in FIGURE 5.

The portion of the timing circuit 32 appearing on FIGURE 7 of the above noted patent application includes the trigger 171 referred to in connection with FIGURE 4 herein and is set forth with minor modifications in FIGURE 5 herein. This portion of the timing circuit 32 also provides the control pulses delivered to terminals 138, 161, 215, and 209' referred to in connection with FIGURE 4 herein.

The output appearing on terminal 170 in FIGURE 4 is applied to the on-side input of the read timing control trigger 171 shown in FIGURE 5 turning the trigger to an on condition. The on-side output of trigger 171 is delivered to the terminal 171' of each of the ten synchronizing latch circuits as previously described and also controls the operation of a multi-vibrator 172. The multi-vibrator is selected to produce five cycles of output during each 65 microsecond character increment.

Three triggers 175, 176, and 177 have gated input circuits and provide a five step ring as will be described. Operation of the ring is started with triggers 175, 176, and 177 off.

The output of multi-vibrator 172 taken on line 173 is a square wave having an initial positive going pulse. This output on line 173 is delivered to the set lines of the inputs of each of the triggers 175, 176, and 177. The on-side output of trigger 175 taken on line 178 serves to gate the on-side input of trigger 176. The on-side output of trigger 176 taken on line 179 serves to gate the on-side input trigger 177. The on-side output of trigger 177 taken on line 180 serves to gate the off-side input of trigger 175. The off-side output of trigger 175 on line 182 serves to gate the off-side inputs of triggers 176 and 177. The off-side output of trigger 177 taken on line 181 serves to gate the on-side input of trigger 175.

This arrangement provides successive switching of triggers 175, 176, and 177 on successive positive going pulses on the output line 173 of multi-vibrator 172 starting with all triggers off as follows: T175 on, T176 on, T177 on, T175 off, T176 and T177 off. Thus, there is provided a five step ring operation of which is initiated by the timing control circuit 31. Each cycle of the ring requires a time interval equal to a character increment. Thus, while the ring cycles are not coincident with character increments, the ring operation is used to define character increments. The ring cycles eight times, i.e., one cycle being initiated after the end of the last character increment, under control of the multi-vibrator 172, whereafter, operation of the multivibrator 172 is arrested by the turning off of trigger 171, as will be described.

A second ring is provided by triggers 183, 184, 185 and 186. The on-side output of trigger 175 taken on line 178 provides set pulses for the gated inputs of each of triggers 183–186. The on-side output of trigger 183, taken on line 187, serves to gate the on-side input of trigger 184. The on-side output of trigger 184 taken on line 188 serves to gate the on-side input of trigger 185. The on-side output of trigger 185 taken on line 189 serves to gate the on-side input of trigger 186. The on-side output of trigger 186 taken on line 190 serves to gate the off-side input of trigger 183. The off-side output of trigger 183 taken on line 191 serves to gate the off-side input of trigger 184. The off-side output of trigger 184 taken on line 192 serves to gate the off-side input of trigger 185. The off-side output of trigger 185 taken on line 194 serves to gate the off-side input of trigger 186. The off-side output of trigger 186 taken on line 193 serves to gate the on-side input of trigger 183.

The eight step ring commences its operation with triggers 183, 184, 185 and 186 off. The first pulse received from the on-side output of trigger 175 serves to set on trigger 183, the second pulse sets on trigger 184, the third pulse sets on trigger 185, the fourth pulse sets on trigger 186, the fifth pulse sets off trigger 183, the sixth pulse sets off trigger 184 and the seventh pulse sets off trigger 185 and the eighth pulse sets off trigger 186.

The coming on of trigger 176 is substantially coincident with the beginnings of each of the character increments. The five steps provided by the five step ring divide each increment into five steps. The eight step ring, executing one step after each five steps of the five step ring, defines eight five step ring operations. The two rings acting together provide a forty step ring which provides the basic timing for the various control pulses provided by the timing circuit during character reading. This timing is fully described in the above mentioned patent application. At the end of the forty steps, the trigger 171 is set off by a pulse from the off-side output of trigger 177 taken on line 181 and gated by the output of an AND circuit 219 having two inputs one from the off-side output of trigger 183 taken on line 191 and the other from the off-side output of trigger 186 taken on line 193. At this time, all triggers of both rings are off.

As previously described, there is provided on terminal 215 of FIGURE 4, a timing pulse for operating a single shot 128. From FIGURE 5, it will be evident that this pulse appears on line 182 which is the off-side output of trigger 175. However, these pulses are gated to the single shot 128 by pulses appearing at 209'. Referring to FIGURE 5, the output of terminal 209' is provided as follows; the off-side output of trigger 185 taken on line 194 is connected to one input of a two input AND circuit 198. The off-side of trigger 183 taken on line 191 is connected to the other input of the AND circuit 198. The output of the AND circuit 198 is delivered to inverter 209, the output of which provides a signal at terminal 209'.

The control pulses for transferring the state of the buffer triggers, reflected in the signals appearing on their respective lines 140 and 139, to the appropriate columns G—B of the register matrix 36 are provided at terminals 201–206, respectively in FIGURE 5.

As has been previously described, at the end of the first character increment, i.e., character increment G, buffer triggers are set on in those channels in which the latch was set on by its quantizing circuit, and, as shown in the timing diagram of FIGURE 6, which will be hereinafter described, a G set pulse is provided for setting each matrix trigger in the right hand most or G column, as indicated in FIGURE 7, to correspond to the setting of the buffer trigger in its channel.

This transfer is accomplished by a pulse provided at terminal 201 in FIGURE 5 and this pulse is taken from the on-side output of trigger 184. The following successive transfers F—B are taken from terminals 202–206, respectively of FIGURE 5. The output at terminal 202 is taken from the on-side output of trigger 185. The output at terminal 203 is taken from the on-side output of trigger 186. The output at terminal 204 is taken from the off-side output of trigger 183. The output at terminal 205 is taken from the off-side output of trigger 184. The output at terminal 206 is taken from the off-side output of trigger 185.

The transfer from the latch circuits to the register matrix at the end of the A interval is not taken through the buffer triggers but is taken directly from the latch circuit terminals 141 and 142 under control of the A set pulse provided on line 207. This output is derived as follows: the on-side output of trigger 177 taken on line 180 is gated to a single shot 196 by the output of an AND circuit 197 taken on line 195. The AND circuit has two inputs, one taken from the off-side output of trigger 185 on line 194 and the other taken from the on-side output of trigger 186 on line 190. Thus the pulses produced by the trigger 177 once with each operation of the five step ring during these character increments are gated once during each operation of the eight step ring during a character interval to produce an output from single shot 196 at terminal 207.

Figure 6:
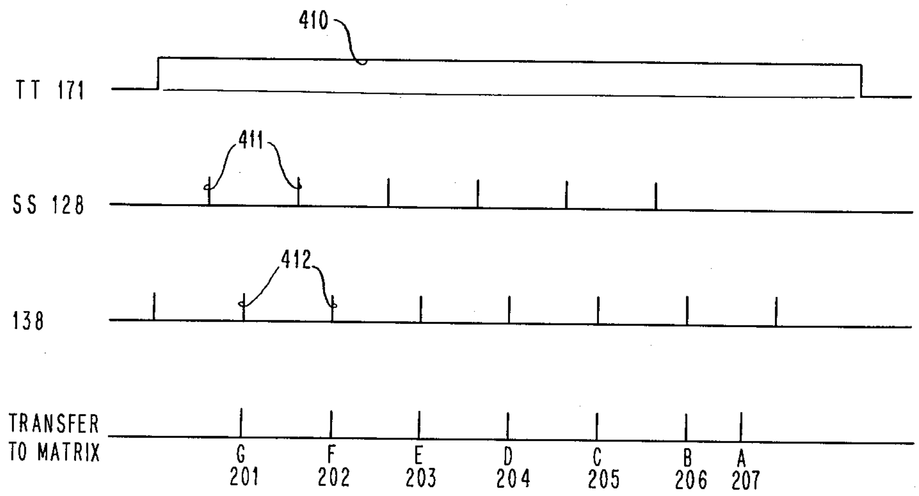
FIGURE 6 is a timing diagram showing relative times of occurrence of control pulses provided by the timing circuit of FIGURE 5 for control of the synchronizer latch circuit of FIGURE 4.

The relative timing of operation of the trigger 171 and the buffer triggers, and the transfers of buffer triggers and latch conditions to the register matrix 36 are shown in the timing diagram of FIGURE 6. On the line designated TT171 there is indicated at 410 the pulse output of trigger 171 appearing on line 171' during a character interval. On the line designated SS128 there is indicated at 411 the timing of the pulses produced by the single shot 128 in FIGURE 4 which are gated to the various buffer triggers by their associated latch circuits if their associated synchronizing latch circuits are set. On the line designated 138, there is indicated at 412, the timing of the pulses employed to reset the buffer triggers. On the line designated Transfer Matrix, there is indicated at 201–207, the timing of the pulses appearing on terminals 201–207, respectively, of FIGURE 5. The operation of this transfer of data as well as operation of the matrix register is fully set forth in the above mentioned patent application and need not be reviewed in detail herein.

The pulses delivered to terminal 138 to turn off the buffer triggers are produced by a single shot 208 in FIGURE 5 actuated by the on-side output of trigger 175.

The document sensing means 15 previously described in connection with FIGURE 1 is shown in FIGURE 5 as a photocell 168 and a lamp 169 positioned so that documents 10 will pass therebetween. However, the sensing means may also be a mechanical switch actuated device or other means providing an output pulse upon the passage of the leading edge of a document to be scanned. This pulse is a positive going pulse and is fed to a single shot 218, the output of which is delivered to terminal 161 for connection to the buffer triggers and various other triggers throughout the timing circuit to insure proper setting of these triggers when a document arrives at the read heads 16. In FIGURE 5, terminal 161 is connected to the off-side inputs of triggers 171, 175, 176, 177, 183, 184, 185 and 186.

An additional variable effecting digitalization arises due to the fact that varying thicknesses of deposition of magnetic ink forming characters produce, when energized, field strengths of various intensities causing variations in the apparent length of signals produced and thus variations in the apparent character sizes. Accordingly, it is desirable to provide circuit means for compensating for this effect in order that the digitalization will truly indicate the existence of a line of sufficient width to be recognized as a character line without adverse influence from variations in signal strength.

Figure 9:
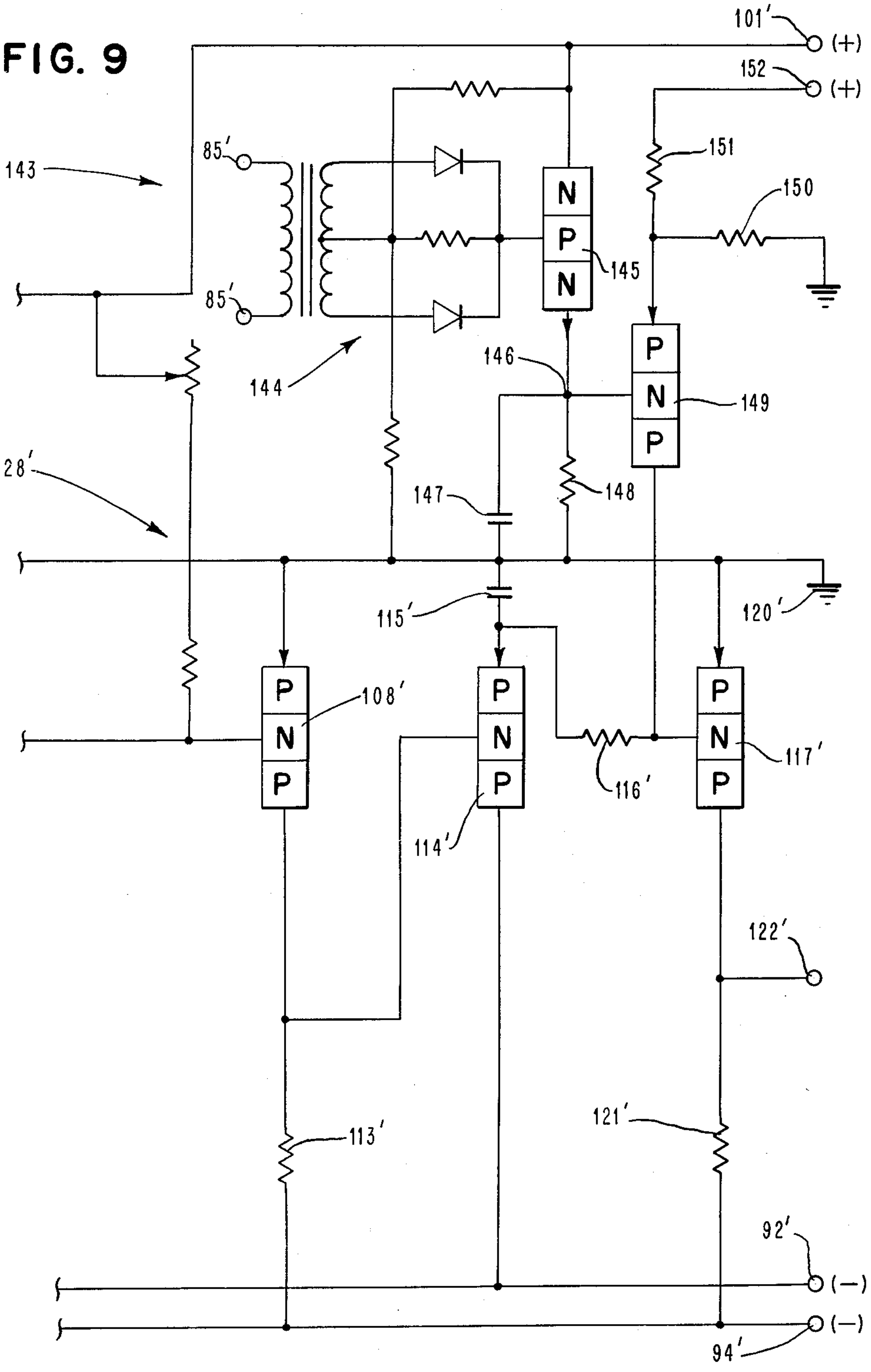
FIGURE 9 is a circuit diagram of a modification of the subtraction-integration circuit shown in FIGURE 3.

In FIGURE 9, there is shown a modification of the subtraction-integration circuit indicated generally at 28 in FIGURE 3. This modification, as will be hereinafter described, provides means for varying the integration time, i.e., the time of relay $\Delta T_t$ shown on line 7 in FIGURE 2, in accordance with the amplitude of the incoming signal thus providing compensation for the apparent change in line width resulting from change in signal amplitude.

In FIGURE 9, there is indicated generally at 28' the same subtraction-integration circuit that has been described in connection with FIGURE 3. The elements in the circuit of FIGURE 9 carry prime values of the same numerals that are employed in the description of the identical elements in FIGURE 3. The circuit indicated generally at 143 represents an addition to what has been formerly described in connection with FIGURE 3.

In FIGURE 9, the output of transistor 108' delivered to the base of transistor 114' is identical with that described in connection with transistors 108 and 114 in FIGURE 3. In FIGURE 9, however, the discharge of the capacitor 115' is controlled somewhat differently from the discharge of the capacitor 115 shown in FIGURE 3. The circuitry providing for this difference will now be described.

As indicated generally at 144, there is a transformer-diode-resistance arrangement providing full wave rectification of the alternating input provided at terminals 85'. These terminals are connected to the same output as the terminals 85 shown in FIGURE 3. The rectifier circuit 144 provides full wave rectification and delivers its output to the base of an NPN transistor 145.

Transistor 145 has its collector connected to the suitable source of positive potential 101' which is identical with the source 101 described in connection with FIGURE 3, and has its emitter connected to the terminal 146 which is connected through a resistance 148 to ground at 120' and through a capacitor 147 to ground at 120'. This ground connection is identical to that indicated at 120 in FIGURE 3.

Terminal 146 is also connected to the base of an PNP transistor 149. The functioning of the rectifier network 144 and the transistor 145 in conjunction with resistance 148 and capacitance 147 is to provide at the base of transistor 149 a D.C. potential level varying with maximum amplitude of the A.C. signal appearing at terminals 85' by going more positive with increasing signal amplitude.

The PNP transistor 149 has its emitter connected through a resistance 150 to ground and through a resistance 151 to a source of positive potential at 152. This potential level is higher than the potential level at 101', and may be, for example, +12 volts if the level at 101' is +6 volts. The collector of transistor 149 is connected between resistance 116' and the base of transistor 117'. It will be evident that transistor 149 and the resistor network connected to its emitter provides a replacement for the resistance 118 and potentiometer 119 shown in FIGURE 3. Thus, when the current through resistance 116' minus the current through transistor 149 is less than that required to keep transistor 117' on, transistor 117' will turn off and the level of conduction of transistor 149 as is determined by the voltage level at terminal 146 resulting from the voltage amplitude of the alternating current signals appearing at 185'.

Thus, in this embodiment of the subtraction-integration circuit principle, the integration time delay, i.e., the delay indicated at $\Delta T_t$ on line 7, is increased by increased signal amplitude thus serving to compensate for the apparent change in character line width resulting from signal strength.

It may again be noted that while the invention disclosed herein is described in connection with the apparatus disclosed in the above mentioned patent application, the quantizing system disclosed and claimed herein may be employed with numerous forms of scanning devices and numerous forms of recognition circuitry other than the matrix and logic type indicated by the register matrix 36 and the recognition circuits 38 shown in FIGURE 1 and described in the above mentioned patent application. The essential novelty in this disclosure is the quantizing circuitry described in connection with FIGURES 2 and 3.

Referring again to FIGURE 2, and to FIGURE 8, it should be noted that the void fill provided by the time delay $\Delta T_1$ in the quantizing circuit is designed to compensate for the occurrence of voids as indicated in 147 in FIGURE 8, in order to prevent these voids from adversely effecting the quantizing operation. On the other hand, the time delay $\Delta T_1$ is of such duration that the effect of spatter will not be added to the next adjacent character line to give rise to an improper quantizing which would possibly result in character timing being started in advance of the edge of a character line.

The $\Delta TT$ time delay insures that character information bearing signals are of sufficient time duration before they are indicated as representing a character line by an output from the quantizing circuit. This time duration is selected to be sufficiently long to prevent information received from random spatter as appearing to indicate the presence of a character line. In conjunction with the foregoing, it will be noted that peaks as indicated at 405 in FIGURE 8 and valleys as indicated at 406 are of dimensions, in printing within reasonable tolerances, that the advanced start or delayed start of character timing resulting therefrom cannot increase or decrease the information bearing signal duration sufficiently to either prevent quantizing during a character increment or give rise to two quantizings in the course of read head passage over a character line of one character increment in width.

In addition to the foregoing, it is noted that decrease in magnetic field intensity with perpendicular distance from the surface of a magnetized record increases with the frequency of magnetization, thus, it is desirable to use a minimum frequency of magnetization. In systems of character recognition employing alternating current magnetization, a one cycle frequency of magnetization over an incremental width of character line is the minimum possible frequency employed and the quantizing system disclosed herein permits the employment of such a wave. It is additionally noted that within the examples of time and speed referred to herein, a fifteen kilocycle energizing wave may be employed and such a wave has an out of contact signal fall-off substantially identical to that occurring when a D.C. record energization is employed. Accordingly, the system provides the out of record contact signal strength provided by D.C. energization and at the same time provides the advantages involved in character recognition systems employing alternating record energization.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Character recognition apparatus comprising means for alternatingly energizing incremental areas forming a character to be recognized with a frequency of approximately one cycle per increment, multi-channel means for sensing said energized incremental areas and producing in each channel alternating outputs in response thereto, means in each channel for receiving said alternating outputs filling gaps therein of less than approximately one half cycle duration and producing, upon duration of a said output for longer than approximately a one half cycle, a signal uninterrupted during the remainder of said output indicative of the number of character increments in the character forming area producing said output, and means responsive to said signals in each channel produced in response to increments of the areas forming a character sensed for recognizing the character.

2. Character recognition apparatus comprising means for scanning a surface carrying energized character forming areas and producing a signal responsive to the surface scanned, quantizing means for determining successive increments of said signal indicative of scanned character forming areas, timing means for establishing a plurality of character incremental intervals during the scanning of a character, and means responsive to said quantizing means and said timing means during successive character incremental intervals for identifying the character scanned, said quantizing means including means responsive to said signal for producing an output indicative of the duration of character information bearing increments of said signal having complete interruptions therein not exceeding a predetermined maximum duration and means delaying the start of said output for the duration of approximately the minimum information bearing time for recognition of a character increment.

3. Character recognition apparatus comprising means for scanning a surface carrying energized character forming areas and producing a signal responsive to the surface scanned, quantizing means for determining successive increments of said signal indicative of scanned character forming areas, timing means for establishing a plurality of character incremental intervals during the scanning of a character, and means responsive to said quantizing means and said timing means during successive character incremental intervals for identifying the character scanned, said quantizing means including means responsive to said signal for producing a continuous output for the duration of character information bearing increments of said signal having complete interruptions in the signal not exceeding a predetermined maximum duration and means delaying the start of said output for the duration of approximately the minimum information bearing time for recognition of a character increment.

4. Character recognition apparatus comprising means for scanning a surface carrying alternatingly energized character forming areas and producing a signal responsive to the surface scanned, quantizing means for determining successive increments of said signal indicative of scanned character forming areas, timing means for establishing a plurality of character incremental intervals of approximately one energizing cycle time duration during the scanning of a character, and means responsive to said quantizing means and said timing means during successive character incremental intervals for identifying the character scanned, said quantizing means including means responsive to said signal for producing an output indicative of the duration of character information bearing increments of said signal having complete interruptions in the signal not exceeding approximately one half energizing cycle time duration, and means delaying the start of said output for the duration of more than approximately one half energizing cycle time duration.

References Cited in the file of this patent

FOREIGN PATENTS

| | | |
|---|---|---|
| 785,853 | Great Britain | Nov. 6, 1957 |
| 1,174,001 | France | Mar. 5, 1959 |